3,447,779
SANITARY VALVE AND NOZZLE ASSEMBLY FOR PRESSURE DISPENSERS
James K. Huling, Belleville, Ill., assignor to Clayton Corporation, St. Louis, Mo., a corporation of Delaware
Filed Aug. 4, 1967, Ser. No. 658,531
Int. Cl. F16k 1/16, 31/00
U.S. Cl. 251—303           8 Claims

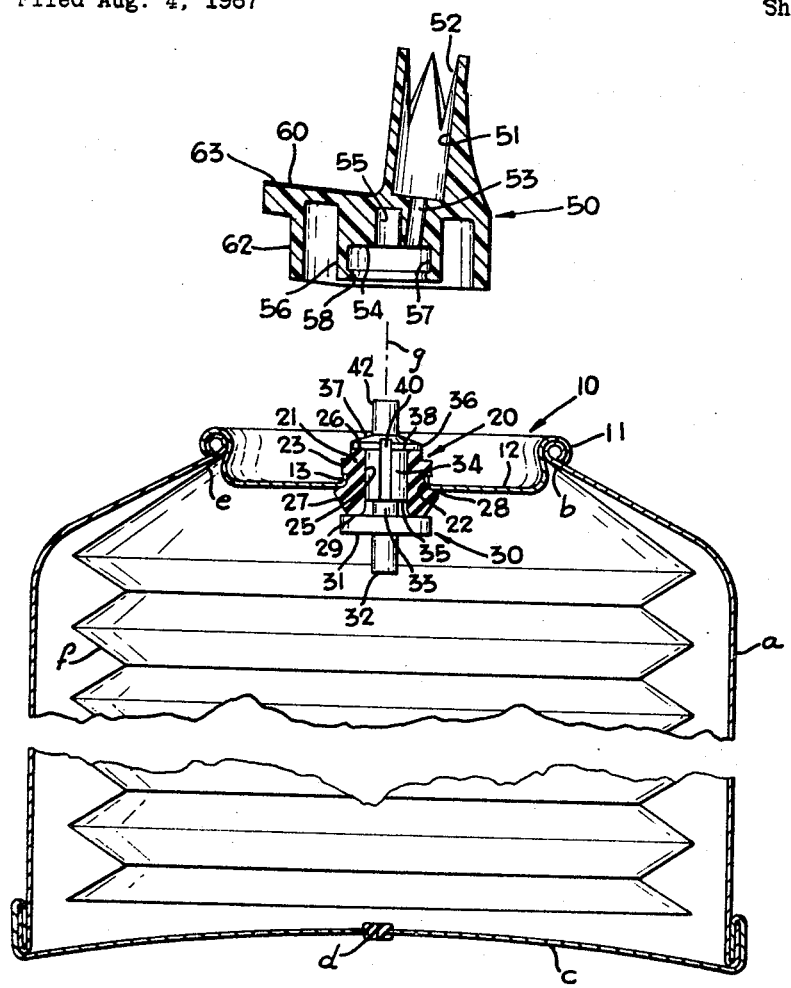
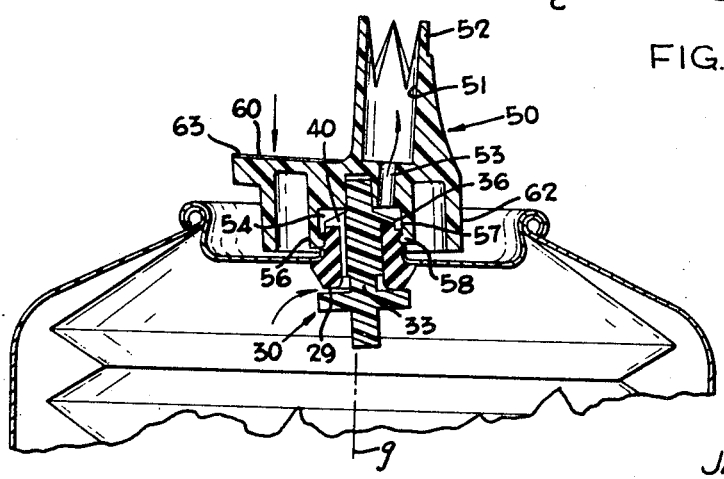
FIG. 1
FIG. 2

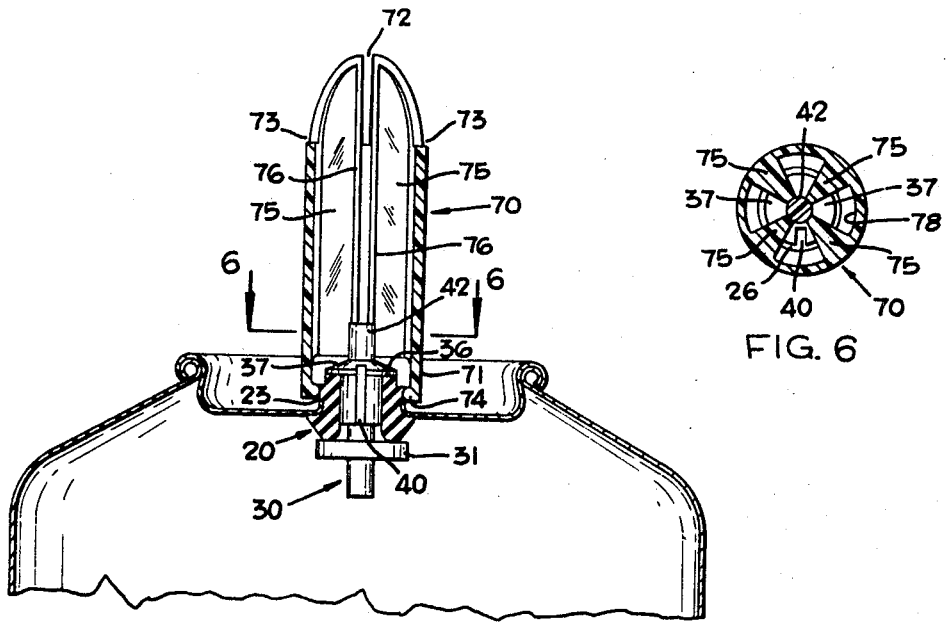
FIG. 5
FIG. 6
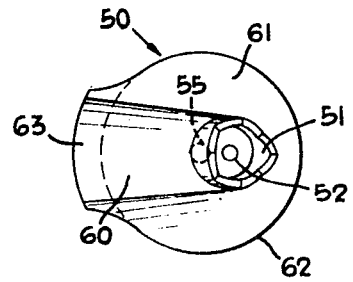
FIG. 4
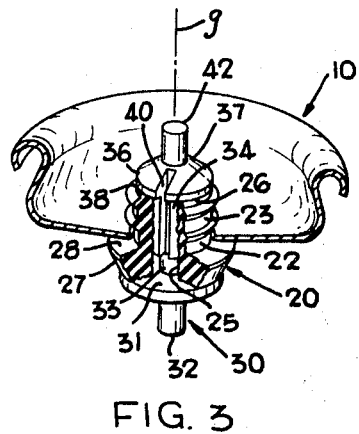
FIG. 3
Inventor
JAMES K. HULING
By Jerome A. Gross
Attorney United States Patent Office 3,447,779
Patented June 3, 1969

ABSTRACT OF THE DISCLOSURE

For use with pressurized dispensers, a sanitary tilt-valve assembly is provided with a snap-on nozzle-actuator which may be pressed on axially without opening the valve, and removed for easy rinsing. Supported in an elastic grommet, a solid stem member has an external flow groove along the stem and through a shoulder overlaying the grommet. The groove is not rinsable, but its volume is minimal. A nozzle actuator mounts axially onto the valve member and has a skirt which snaps sealedly onto the grommet periphery.

Background of the invention

The invention relates to dispensing valves for throw-away pressurized dispensers, such as have long been used for shaving lathers and other foamed products, and to a lesser extent for nonfoamed foods of pasty consistency, such as cake decorations. The preferred type of valve here utilized opens by tilting. It includes a tubular grommet which seals the container top and provides a seating surface below it against which the valve member closes, and has a vertical sleeve which surrounds at least the lower part of the stem of the valve member.

Objections may be made to using such valves for dispensing certain food products which may dry, spoil or otherwise deteriorate in the outlet of the valve. For example, with tubular stem valves, such as in U.S. Patent No. 2,615,597 and others, opening the valve for the first dispensing leaves the entire tube length of the dispensing stem filled with the product dispensed. If after filling and gassing, a supplementary nozzle-actuator is to be applied downwardly to engage the stem, as in U.S. Patent No. 2,831,618, the downward force of assembling may open the valve enough to emit some of the food contents into the stem and nozzle-actuator, where they may spoil.

With solid stem valves, such as shown in U.S. Patents Nos. 2,487,434 and 2,612,293 (FIG. 7) the stem is accommodated loosely within the grommet sleeve; and a tubular nozzle-actuator is fitted over it. Once operated, the entire annular space around the stem within the grommet sleeve is left filled with such product which may deteriorate. In the last-mentioned patent, the nozzle-actuator is secured to the valve stem, to aid in tilting it; but is not removable and will also remain filled with such product. In Patent No. 2,487,434 the nozzle-actuator is removable, but does not directly engage the valve stem.

Summary of the invention

The present sanitary valve and nozzle assembly for pressure dispensers comprises an apertured container top member, an elastic sealing grommet, a valve member, and a removable, axially applied nozzle actuator which engages both the valve member and the grommet.

The sealing grommet has a vertical sleeve portion with an outer aperture-sealing surface and an outer actuator-sealing surface thereabove. A body portion of the grommet, which adjoins the lower edge of its sleeve portion, is located beneath the container top member, and terminates in a lower valve-seating surface.

Grasped within the inner surface of the grommet sleeve portion is the solid stem portion of a molded plastic valve member, whose head is presented for seating against the lower seating surface of the grommet body portion. Outwardly of the grommet, the valve member has a shoulder abutting downwardly against the annular upper edge of the grommet sleeve. The elasticity of the grommet thus tends to hold the valve erect and presents its head seated and sealed. When unseated, the contents of the dispenser may flow outward through a flow-conducting groove, which extends longitudinally outward along the stem, from a point adjacent to the head, to and through its shoulder. The sleeve portion of the elastic grommet bridges over this groove and does not prevent flow through it.

The nozzle-actutaor member engages the valve member above its shoulder, preferably by sliding axially onto an outer pin portion thereof. It has a skirt portion which is sealedly engaged by snapping onto the actuator-sealing surface of the grommet closely outward of the container top member. Force applied in assembling the actuator is resisted through the grommet by the container top member, without such deflection as would unseat the valve head.

In one preferred embodiment, the nozzle outlet of the nozzle-actuator is nonconcenttric with the stem member; a concentric blind bore telescopingly receives the pin portion. Downward force applied to a nonconcentric finger actuation portion will tilt the stem member to open the valve. Ridge and groove means, between the inner surface of the actuator skirt portion and the peripheral actuator-sealing portion of the elastic grommet, permits easy removal of the nozzle-actuator member and snap-on replacement.

In an alternate embodiment, a removable nozzle-actuator is generally tubular from its snap-on skirt portion to a concentric nozzle outlet. Vanes extend radially inward to slide along the outer pin portion of the valve member, with flow passages alternating between the vanes. A lateral force applied to the actuator tilts the valve stem portion to unseat the valve head.

In both embodiments, removal of the nozzle actuator permits rinsing it and also the exposed parts of the valve member and the grommet.

Brief description of the drawings

FIG. 1 is a sectional view, partly fragmentary, of the valve assembly of the present invention, installed in a dispensing container including gas under pressure, one type of nozzle-actuator being shown removed vertically upward.

FIG. 2 is a view similar to FIG. 1, the valve member being rotated 90°, with the nozzle-actuator being in place and tilted to open the valve.

FIG. 3 is an enlarged perspective view, partly broken away, of the present valve assembly without a nozzle-actuator.

FIG. 4 is a top view of the nozzle actuator of FIGS. 1 and 2.

FIG. 5 is a sectional view of an embodiment utilizing an alternate type of nozzle actuator.

FIG. 6 is a vertical section taken along line 6—6 of FIG. 5.

Description of the preferred embodiments

A single-use steel dispenser container can $a$ terminates upwardly in a curled rim $b$ which received a standard container top member or mounting cup generally designated 10. It includes a high-standing annular rim 11 which fits onto and inwardly of the curled rim $b$, and a flat top wall 12 having a central upwardly flanged aperture 13. The can bottom $c$, which includes a conventional rubber pressure inlet valve *d*, is seamed to the can *a* only after mounting, between the annular rim 11 and the curled rim *b*, the mouth rim portion *e* of a bellows-like plastic bag *f*, of known design. After filling the bag *f* with the product to be dispensed, the valve assembly without nozzle-actuator, as shown in FIG. 3, is mounted and crimped sealed in place. The pressure of gas, then inserted into the container through the rubber pressure inlet valve *d*, will cause the bellows bag *f* to collapse progressively when the valve is operated.

In combination with the container top member 10, the sanitary valve of the present assembly includes a sealing grommet generally designated 20, formed of elastic rubber whose composition is compatible with the food or other product to be dispensed; a solid stem valve member generally designated 30, formed preferably of a rigid plastic; and one of the nozzle actuators 50, 70 hereinafter described or an equivalent actuator.

The sealing grommet 20 is generally tubular, including a vertical sleeve portion 21 having a radially outer aperture-sealing surface 22 which fits within the flanged aperture 13 of the container top member 10. Above the surface 22 is a peripheral actuator-sealing surface 23; it projects outward beyond the aperture-sealing surface 22 so as to overhang the flanged aperture 13 and thereby to support the valve assembly in the container top member 10. For sealing and gripping the actuator, the actuator-sealing surface is grooved inwardly. It extends outward over the flanged aperture 13 so closely that there is no appreciable deflection when a downward force, applied to the peripheral actuator sealing surface 23, is resisted by the flanged aperture 13.

The sleeve portion 21 includes an inner sleeve sealing surface 25, and terminates upwardly, well above the container top member and a short distance above the peripheral actuator sealing surface 23, in an upper annular edge surface 26.

Adjoining the lower part of the sleeve portion 21, beneath the container top member 10, the sealing grommet 20 has a body portion 27 including an upper, radially enlarged pressure-sealing flange 28, and a horizontal lower seating surface 29. Radially inward from the seating surface 29, the body portion 27 curves inward and upward to join the inner sleeve sealing surface 25.

The rigid plastic valve member 30 has a central axis *g*. Transverse to the axis *g* is a disc-like head portion 31 which seats against the horizontal lower seating surface 29. Extending downwardly from the head portion 31 is a short depending projection 32, used for handling during assembly. Above the head 31, the valve member 30 has a lower cylindrical solid stem portion 33 and an upper grooved stem portion 34 of larger radius providing an overhang 35 which projects radially outward over the lower stem portion 33. When the valve member 30 is tilted in any direction, to unseat the head portion 31 the overhang 35 provides flow communication through the annular space around the lower stem portion 33.

At the upper extremity of the grooved stem portion 34 the valve member 30 is provided with a flange 36 whose upper surface 37 slopes outward and down, and whose lower annular surface or shoulder 38 abuts downwardly against the upper annular edge surface 26 of the sleeve 21. Through this stem portion 34 and flange 36 extends a flow conducting groove 40, formed inwardly toward the center axis *g* to about the same radial distance therefrom as the lower stem portion 33. The groove 40 remains open, to conduct flow, despite the grasp of the sleeve 21 about the grooved stem portion 34.

For purpose of receiving a tilting force to open the valve, the valve member 30 has a vertical outer pin portion 42 projecting beyond the upper surface 37 of the flange 36. It is formed to permit axial sliding of an actuator thereon; for use with the actuators hereinafter described, the pin portion 42 has a cylindrical outer surface.

A nozzle actuator designed to cooperate with the valve member 30 and the sealing grommet 20, in the manner herein described must include means to engage the valve member 30 above the grommet 20 to apply an opening force by titling, a portion conducting flow to a nozzle outlet, and a skirt portion to be sealedly engaged by the peripheral actuator sealing surface 23 of the elastic sealing grommet 20.

One preferred form of nozzle-actuator, generally designated 50, is shown in FIGS. 1, 2 and 4.

It has a nonconcentric sloping nozzle outlet 51 terminating in a decorator tip 52. At the base of the outlet 51 is a flow conducting bore 53 leading from one side of an inverted well or dome portion 54. As shown in FIG. 2, when the nozzle-actuator 50 is assembled in place, an annular dome-like flow-directing chamber is formed above and outward of the sloping upper surface 37 of the flange 36 of the valve member 30. The means to engage the valve member 30 above the grommet 20 consists, in this embodiment, of a blind bore 55 in and concentric with the well 54; it is also concentric with the outer pin portion 42 and of sufficient diameter to receive it telescopingly. In fitted position, as shown in FIG. 2, the inverted well or dome portion 54 is spaced above the higher point on the sloping upper flange surface 37.

The inverted well 54 has a side wall formed by a skirt portion 56 whose inner surface 57 forms the outer wall of the dome-like flow-directing chamber; at its lower edge, an inwardly formed ridge 58 is sealedly engaged on assembly by the grooved peripheral actuator sealing surface 23 of the elastic sealing grommet 20.

Axial clearance is provided between the upper end of the pin portion 42 and the upper end of the blind bore 55; hence any downward force applied to the nozzle actuator 50 will be resisted entirely by this engagement, and will not drive the valve member 30 downward.

As best shown in FIG. 4, an off-center, or eccentric, finger pad portion 60 serves as part of the top surface 61 of the nozzle actuator 50; which is extended radially, for better appearance, so that a false outer skirt 62 depending from it fits with clearance within the container top member 10. The eccentric finger pad portion 60 is itself extended radially even a greater distance, to provide a finger pad enlargement 63 as shown in FIGS. 1 and 4. A downward force applied by the user, as shown by the downward-extending arrow in FIG. 2, is eccentric to the axis *g*. When so applied, the engagement of the blind bore 55 onto the side surface of the pin portion 42 tilts the valve member 30, as shown in FIG. 2, opening one side of it from the horizontal lower seating surface 29. This permits inflow around the lower stem 33, upward through the flow conducting groove 40 and past the flange 36, through the flow-directing annular chamber between the upper surface 37 and the inverted well 54, to the flow-conducting bore 53 and into the nozzle outlet 51.

The snap-on sealed engagement between the actuator-sealing surface 23 and upper inner surface 57 serves to contain the outflow of container contents beyond the flange 36; so that they are directed through the annular dome space within the inverted well 54 to the flow conducting bore 53 of the outlet 51. The clearance between the upper ends of the flow conducting groove 40 and blind bore 55 and between the upper surface 37 and inverted well 54 will avoid any direct downward pressure of the nozzle actuator 50 on the valve member 30.

In assembling the parts shown in FIG. 1, before the bottom *c* is seamed onto the can *a*, the bellows-like plastic bag *f* is inserted from below and its flanged mouth portion *e* is positioned over the curled rim *b*. For packing, the bag *f* is filled with a creamy product such as cake decoration; then the annular rim 11 of the container top member 10, with the sealing grommet 20 and valve member 30 assembled in place, is positioned on the mouth portion *e* and crimped to seal, as shown in FIG. 1. Pressurizing gas, such as carbon dioxide is inserted around the bag *f* through the rubber pressure inlet valve *d* in the container bottom *c*.

Nozzle actuators 50 are then mechanically applied from above. Regardless of the downward force of mechanical application, it is resisted by the grommet surface 23, not by the valve member 30. None of the food product contained will be discharged from the plastic bag *f* into the valve assembly to spoil or deteriorate.

When the consumer dispenses the product by tilt-operating the valve, the inner portions of the valve and actuator assembly will, after each use, be filled with the product dispensed. To rinse out such product, the user withdraws nozzle-actuator 50 axially, snapping loose the engagement of the surface 23, and readily rinses the product from the inverted well 54, flow conducting bore 53, outlet 51 and decorator tip 52. The outer surface of the valve member 30, particularly the flange surface 37, and of this grommet sleeve portion 21 are also readily rinsed.

In the alternate embodiment shown in FIGS. 5 and 6, a tubular nozzle actuator generally designated 70 is employed. It includes a lower concentric skirt portion 71, and leads upwardly to a concentric decorator outlet 72 having tip slots 73. Within the base of the lower skirt portion 71 is an inwardly extending annular ridge 74 which, like that of the previous-described embodiment, grasps the groove of the actuator-sealing surface 23 of the grommet 20.

Above the lower skirt portion 71 and extending radially inward to the outer surface of the pin portion 42 above the shoulder surface 37, are a plurality of vanes 75, having inner surfaces 76 which may slide axially against the pin portion 42 without applying any downward force. The vanes 75 may extend upward to the decorator outlet 72, for easy molding. Valve actuation is by a lateral force; the engagement of the vanes on the side surface of the pin portion 42 tilts the valve member 30. Flow passages 78 alternate between the vanes 75, to provide outflow when the head 31 is unseated. As will be seen, this nozzle-actuator has the same rinsability as the embodiment heretofore described.

To vary the decorative pattern, the user may easily substitute a nozzle-actuator having a differently patterned decorator outlet 72. Also institutional users, such as restaurant operators, who use large quantities of such products may easily transfer the nozzle-actuators from one dispenser to the next.

I claim:

1. A sanitary valve and nozzle assembly for pressure dispensers, comprising
   a container top member having an aperture,
   an elastic sealing grommet having
   a vertical sleeve portion including an outer aperture-sealing surface, by which the grommet is mounted in the container top aperture, an outer peripheral actuator-sealing surface thereabove, and an inner sleeve sealing surface terminating above the container top member in an upper annular edge surface,
   the grommet further having a body portion adjoining the lower part of the sleeve member and located beneath the container top member and terminating in a lower valve seating surface,
   in combination with
   a valve member including a head presented for sealing against the lower seating surface of the grommet body portion,
   a solid stem extending outwardly from the head through the grommet and grasped within the inner sealing surface of the grommet sleeve, and
   a shoulder abutting downwardly against the annular upper edge of the grommet sleeve,
   the valve member having a flow-conducting groove extending outwardly along the stem to and through the shoulder,
   whereby to permit flow therethrough when the valve head is unseated despite the grasp of the grommet sleeve about the valve stem,
   in combination further with a nozzle-actuator member having a nozzle outlet,
   means, engaging the valve member above the grommet, to apply to the valve member an opening force, and having
   a skirt portion extending below the shoulder and including an inner skirt surface sealedly engaged by said peripheral actuator-sealing surface of the grommet,
   whereby outflow through the groove and into the nozzle-actuator is contained by such sealed engagement and thus directed to the nozzle outlet of the nozzle-actuator member.

2. A valve and nozzle assembly as defined in claim 1, wherein
   ridge and groove means is provided at the inner skirt surface and the peripheral actuator-sealing portion of the elastic grommet,
   whereby the elasticity of the grommet permits the actuator nozzle to be readily removed for rinsing the assembly.

3. A valve and nozzle assembly as defined in claim 1, wherein
   the valve member opens by tilting, and
   the peripheral actuator-sealing surface of the grommet is closely adjacent to the container top member,
   whereby downward force applied to an actuator thereon concentric with the valve member is resisted by the container top with so little deflection of the grommet portion therebetween as to avoid unseating the valve head axially from the seating surface.

4. A valve and nozzle assembly as defined in claim 3, wherein
   the stem member has vertical outer pin portion projecting beyond the shoulder, and
   the actuator's means to apply a valve-opening force comprises a portion above the actuator skirt portion into which said pin portion is received and which engages the side surface of the pin portion.

5. A valve and nozzle assembly as defined in claim 4, wherein
   the nozzle-actuator member generally is tubular and its nozzle outlet is concentric with its skirt portion and its means to apply a valve opening force comprises
   a plurality of vanes beneath the nozzle outlet extending radially inward to the outer pin portion of the valve member and
   having a flow passage between the vanes.

6. A valve and nozzle assembly as defined in claim 3, wherein
   the nozzle-actuator member has an inner dome portion and
   its said means to apply a valve-opening force comprises a blind bore concentric with the outer pin portion of the stem member, and
   the nozzle outlet of said nozzle-actuator is nonconcentric with the stem member, and
   said inner dome portion communicates between the groove at the shoulder and the nozzle outlet.

7. A valve and nozzle assembly as defined in claim 6, wherein
   axial clearance is provided between the upper end of the pin portion and the end wall thereabove of said blind bore,
   whereby mounting the nozzle-actuator thereon applies no downward force to the valve stem and thus avoids opening the valve when the actuator is assembled thereto.

8. A valve and nozzle assembly as defined in claim 6, wherein the nozzle-actuator has a finger actuator portion nonconcentric with the valve stem, whereby a force applied downwardly onto said portion will tilt the valve stem and thereby open the valve.

References Cited

UNITED STATES PATENTS

| | | | |
|---|---|---|---|
| 2,615,597 | 10/1952 | Tomasek et al. | 251—303 X |
| 2,869,764 | 1/1959 | Collins | 222—402.23 |
| 2,889,086 | 6/1959 | Collins | 222—402.22 |
| 3,108,721 | 10/1963 | Nebingen | 251—350 X |
| 3,169,672 | 2/1965 | Soffer et al. | 222—402.13 X |
| 3,333,744 | 8/1967 | Nilsen et al. | 222—402.13 |
| 3,357,604 | 12/1967 | Barker | 222—402.23 |

M. CARY NELSON, *Primary Examiner.*

R. C. MILLER, *Assistant Examiner.*

U.S. Cl. X.R.

222—402.13, 402.23; 251—350